H. R. ROBINSON.
GRAIN THRESHER AND SEPARATOR.
APPLICATION FILED FEB. 4, 1907.
910,477.
Patented Jan. 19, 1909.
3 SHEETS—SHEET 3.
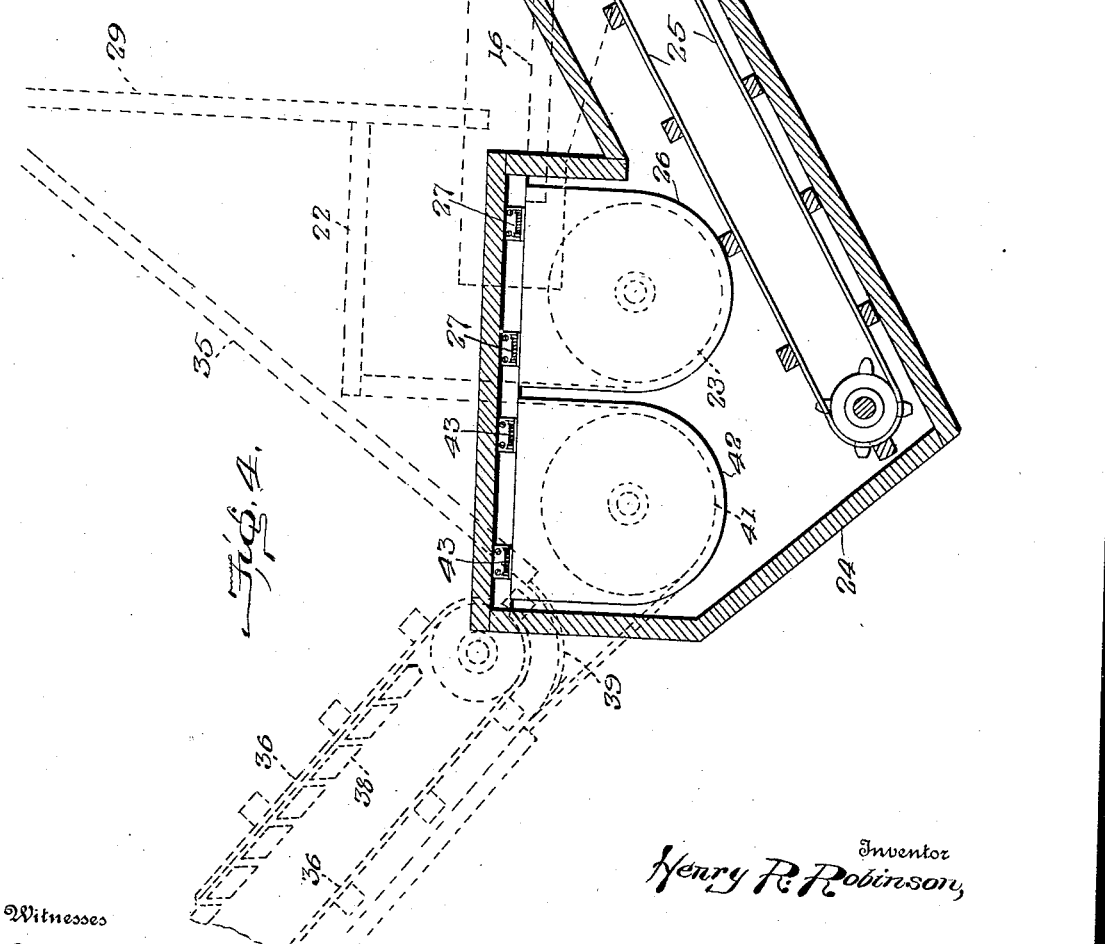

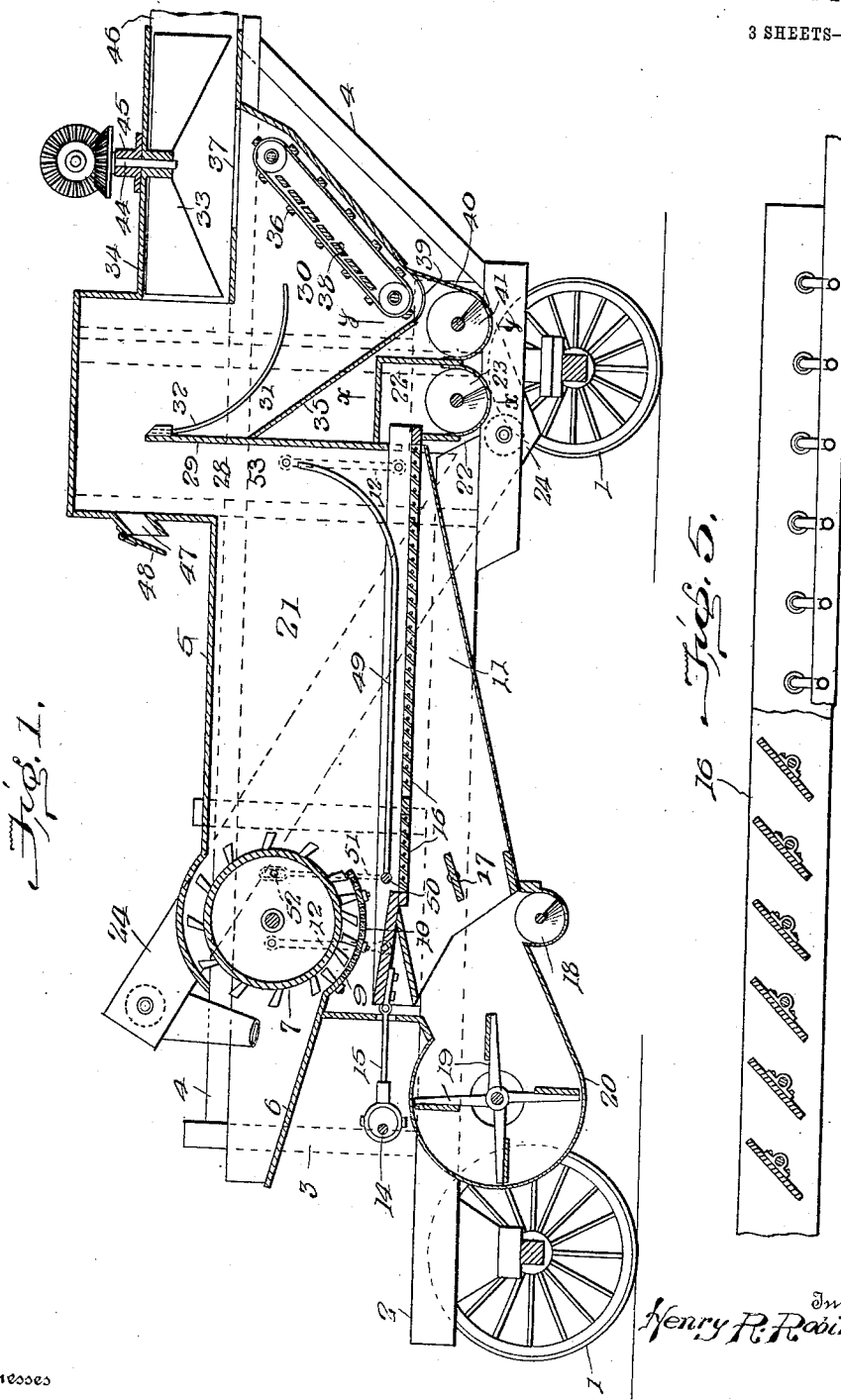

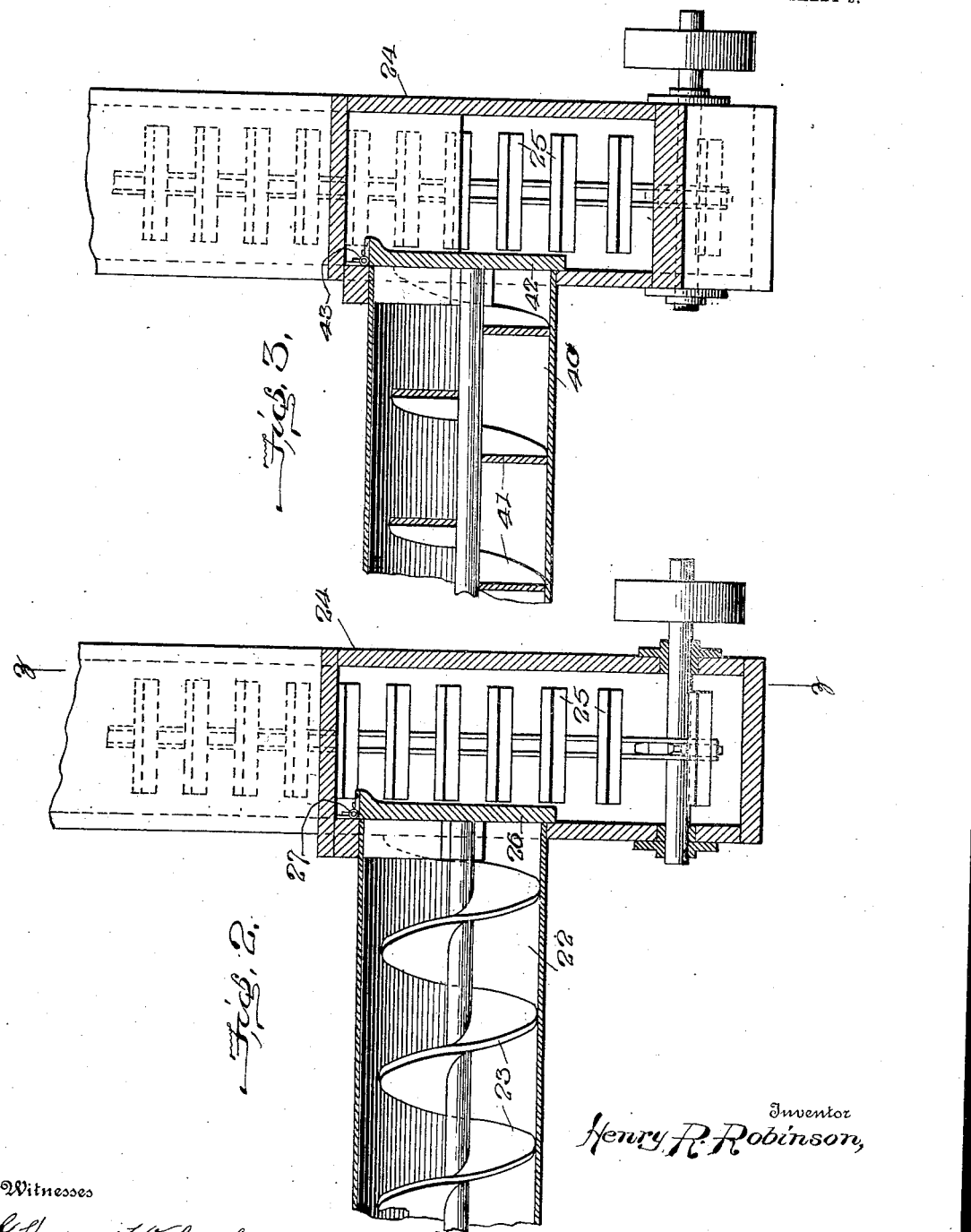

ated to departs entirely# UNITED STATES PATENT OFFICE.

HENRY R. ROBINSON, OF RICHMOND, INDIANA, ASSIGNOR TO ROBINSON & CO., OF RICHMOND, INDIANA, A CORPORATION OF INDIANA.

GRAIN THRESHER AND SEPARATOR.

No. 910,477.  Specification of Letters Patent.  Patented Jan. 19, 1909.

Application filed February 4, 1907. Serial No. 355,580.

*To all whom it may concern:*

Be it known that I, HENRY R. ROBINSON, a citizen of the United States, residing at Richmond, in the county of Wayne and State of Indiana, have invented certain new and useful Improvements in Grain Threshers and Separators, of which the following is a specification, reference being had therein to the accompanying drawings.

This invention relates to improvements in grain threshers and separators, and the object of the invention is to depart entirely from the common type of machines of this character, wherein are employed a series of shaking screens or chaffers for the purpose of separating from the straw that part of the grain which travels and is intermixed with the straw after the same leaves the threshing cylinder and concave.

To this end my invention consists, essentially, in the employment of the combined forces of an air blast and an air suction, which forces act on the straw at points between the rear of the threshing devices and the discharge from the machine, the blast coming up from below to lift the straw enough to carry it within the range or zone of action of the suction, whereby the blast need be only strong enough to lift the straw a comparatively short distance and which blast is, therefore, prevented from being strong enough to blow off the grain as well, and whereby the suction also need be only strong enough to take hold of the straw, commencing at a point above that occupied by the grain. It will be understood that the straw leaves the threshing cylinder and concave in a state of rapid velocity and in a loosened condition, and that from about 75% to 80% of the grain is dislodged from the straw by the action of the threshing devices and falls through and immediately behind the concave and thence through a chaffer or screen into the gathering shoe as clean grain. It is the remaining 20% to 25%, approximately, of the grain which is in this rapidly moving and scattered straw that is to be recovered by the instrumentalities of my invention, and it is a leading purpose of my invention to prevent this rapidly moving and loosened quantity of straw from losing its velocity and its loosened state, and becoming massed and partially inert, and this I accomplish by floating the same onward and upward by the action of the blast, tempered to accomplish this purpose, without carrying with it the grain which is fast falling from the loosened and traveling straw, and the straw being so floated and directed upward is thus brought within the range or zone of action of the suction and carried off and out of the machine. Again, as to the said 75% to 80% of loosened grain coming from and through the concave, it will be understood that by the location of the shoe with its screen or chaffer, under and back of the cylinder and concave, I clean and save or gather this per cent. of the grain without allowing it to become mixed with the chaff and refuse matter; this gathering and saving of such grain at this point preventing the possibility of its being carried off by the air blasts. So that while, primarily, my invention is designed to separate that part of the grain which leaves the threshing devices unseparated, still it also comprehends the cleaning and gathering of the grain which comes from the threshing devices practically separated from the straw.

It is also a further object of my invention to combine and utilize, in connection with one or both of these air forces, an agitator upon which the straw, or more or less of it, will fall after leaving the threshing devices, where the quantity, quality or kind of grain makes it desirable to use a particularly light blast to avoid driving off this grain; the effect of such agitator in such case being to shake this grain (usually of light weight) out of the straw, to facilitate the work of one or both of the air forces—blast and suction.

A still further object of my invention is to combine with the action of these blast and suction air forces a settling chamber or enlarged space where the air currents may automatically weaken in force by being permitted to expand in this larger area or inclosure, whereby any grain still within any part of the straw may have this final opportunity to escape therefrom as the straw opens out by the spreading of the air currents, there being preferably provided adjunct devices to deflect the straw being so treated toward the suction fan and at the same time to permit the falling from this straw of the grain thus given a chance to become freed.

The preferred arrangement and type of construction for carrying into effect this invention and the objects above stated I have illustrated in the accompanying drawings, but it must be understood that this is only one form and arrangement and that my invention contemplates and includes other forms and arrangements for effecting the same results.

In the drawings Figure 1 is a longitudinal sectional view of a threshing machine; Fig. 2, a detail transverse sectional view, taken on the line x x of Fig. 1, showing the tailings conveyer and the elevator for returning these tailings to the threshing devices; Fig. 3, a like view to Fig. 2, but taken on the line y y of Fig. 1, showing the settling chamber conveyer in its relation to the same elevator; Fig. 4, a longitudinal sectional view taken through the line z z of Fig. 2, showing the same elevator in section, the doors which close the casings of said conveyers in elevation, and the conveyers, themselves, in dotted lines behind the doors; Fig. 5, a detail of the chaffer; and Fig. 6 of the spring hinge.

On the usual ground wheels 1 is mounted a frame indicated at 2, 3 and 4, of a construction substantially like that commonly employed in threshing machines. This frame is boarded up or paneled to form a casing 5, whose interior is occupied by the various instrumentalities of the machine. A feeding table 6 leads to a threshing cylinder 7 and concave 9, of the usual type, the concave having a grate or perforated portion 10 through which, as usual, much of the grain threshed out passes, while some of it also passes over the tail of the grate. The lower portion of the machine, from and under the concave to a suitable distance beyond the same, is occupied by a shoe 11, suspended by links or hangers 12, as shown in dotted lines. This shoe is vibrated or reciprocated back and forth by any suitable means, say an operating shaft and its eccentric 14 and eccentric rod 15. The upper portion of the shoe is in the form of a riddle or chaffer, shown at 16, and preferably has its slats pivoted so that they can be adjusted to regulate the size of the openings between them, according to the grain being treated, which grain is to pass through these openings and into the shoe, and according also to the size of openings desired for the passage of the air blast, the tilting of the slats to different angles also directing the course of the blast. The details of this shoe are not unlike those in common use, though in this case the shoe is associated with other functions. A damper or deflecting wind-board 17 is also pivotally mounted in the shoe and adapted to be turned to different positions, so as to direct the air blast more strongly or directly to one point or another, as occasion may require in use. The grain which passes into this shoe, which is the grain that comes from and through the grate, already separated, the 75% or 80%, before referred to, as also the remainder of the grain which is separated from the straw (except such as is gathered in the settling chamber) is caught by the conveyer 18, which I term the cleaned grain conveyer. This grain is delivered to one side of the machine in the usual way. A blast fan 19, mounted in a suitable casing 20, is arranged to deliver its blast into the shoe, as clearly shown in Fig. 1. This fan, like the conveyer 18, is operated by any suitable means or belts. The blast produced by this fan, on passing through and from the shoe 11, enters the separating chamber 21 of the machine. In doing so the straw which is issuing from the threshing devices, with considerable velocity and in a more or less loosened or separated condition, is caught and floated or lifted upward and outward before it has an opportunity to settle and mass. The blast is tempered or regulated to be sufficient for this purpose, and as it catches the straw in this moving and loosened or separated state, it requires less blast to so carry off the straw than will overcome the specific gravity of the grain itself, which, therefore, is practically unimpeded in its natural descent as it loses its rearward momentum. The effect is also to blow away from the intermingled grain the straw which is about it, thus effecting a practically complete separation of grain and straw. But to insure a fully perfect separation and saving of the grain, and to meet various conditions and kinds of straw and grain, the settling chamber and its adjuncts, to be hereinafter referred to, are provided. Such unthreshed heads, straw joints, weed stems or other foreign matter as are too heavy to be taken up by the air suction, and too coarse to pass through the screen or chaffer of the shoe, travel over the shoe as tailings, being aided in their travel by the blast, and descend into the casing 22, of the tailings conveyer 23, whence they are returned to the feed table 6 by the elevator, composed of the trough 24 and endless belt, with its slats, 25, shown in detail in Fig. 2. This figure also shows a door or valve 26, hinged to close the discharge end of the casing of the tailings conveyer, and provided with a spring 27 to keep it closed against such portions of the blast as enter the casing 22. This door is closed in the sense that it stands across the discharge end of this casing enough to prevent the air from finding a ready escape, though it will open just enough to allow the limited quantity of material delivered by the tailings conveyer to pass into the elevator 24, 25.

Returning now to the straw which has been lifted and floated upward by the blast and has been caught by the suction, it will be seen that the same passes upward into the straw passage or conduit 28 formed between the outer casing 5 and the partition or baffle-wall 29, which divides the separating chamber 21 from the settling chamber 30.

Some of the grain still in this straw strikes against this wall or partition and drops down and finds its way into the shoe 11, while some small portion of it will, through all the time or sometimes, pass over the partition and thence enter into the settling chamber 30, along with the straw. As this chamber is enlarged in comparison with the relatively restricted straw passage or conduit 28, the suction current, by a natural law, will expand and thus open out the body of straw and cause it to lose entirely whatever grain may still be in it. The straw will most usually largely, if not wholly, strike upon the deflector 31, composed preferably of a series of yielding fingers secured at their upper ends, as shown at 32, and free to yield or vibrate at their other ends, so as to enter into a state of tremor or vibration, which tends to shake out the grain as the straw is arrested and diverted off more directly toward the suction fan 33 mounted in a suitable casing 34, which is, in effect, a continuation of the general casing of the machine. The grain passes, in part, between the fingers of the deflector 31 and, in part, drops from the straw just before it leaves the settling chamber. Thus some of the grain separated in the settling chamber falls upon the incline floor 35 and some of it upon the endless carrier or raddle, 36, together with some small particles of straw, these particles of straw being elevated to near the eye 37 of the suction fan and the grain passing between the belts of the elevator or raddle and onto the perforated bottom 38, whence this grain, together with that coming down the incline 35, falls upon the screen 39, composed preferably of a series of wires, whence it drops into the casing 40 of the settling chamber conveyer 41, by which it is carried to the elevator 24, 25 and thence back to the feeding table 6 and again through the threshing devices, whence it reaches the screen or chaffer top of the shoe 11 and goes off as clean grain. A door 42, as seen in Fig. 3, closes the casing 40 in the same manner as the door 26 closes the casing 22, springs 43 being applied to the door 42 to cause it to so close the end of the casing 40 as to prevent air currents from passing through this casing, yet permitting the grain delivered by the conveyer 41 to pass thence into the elevator 24, 25.

Referring again to the suction fan 33, it will be seen that it is mounted on a shaft 44, having a bearing 45 in the casing 34, and provided with suitable gearing or other means for rotating it. A discharge conduit 46 leads from this fan casing and is utilized to deliver the straw according to the wishes of the user.

At a point adjacent to the conduit 28, I have provided a valve device composed of an orifice 47 and a door or flap 48, through which air may be taken from the outside of the machine to reduce the suction currents passing through this conduit. At times it is desirable to temper the velocity of this suction current, and by the provision of one or more of such valve devices this tempering may be accomplished, yet without restricting the area of this straw conduit, which would tend to cause the straw to choke therein. Of course, in a general sense, the speed of the blast and suction air currents will be determined by the speed and size of the blast and suction fans, and this matter is taken care of by the fixed sizes and average speeds, but tempering these currents at will at times is necessary, and hence this provision of a tempering valve.

So far I have described my machine with reference to its construction and uses under ordinary conditions. But at times the quality, quantity or kind of grain will make it desirable to use an agitator in the separating chamber 21, so that a blast weakened to suit the specific gravity of such grain may be used and yet the straw be lifted within the range of the suction currents. For such purpose I have constructed an agitator preferably composed of a series of long steel or flexible bars 49, mounted on a rock-shaft 50, having bearings in the shoe 11, and having an arm 51 (shown in dotted lines in Fig. 1) whose upper slotted end fits over a fixed pin 52. Thus when the shoe is reciprocated back and forth, the bars of this agitator will be given a vibratory motion. The effect of this is to agitate, shake up and more or less lift the straw, thus aiding in freeing the grain therefrom and also aiding a weaker blast current in lifting it within the space or zone where the suction currents become effective, say at and around a point about that indicated 53. It will be understood that the air current begins to lose its force, so far as the blast fan is concerned, at about this point 53, and would be very weak beyond that point but for the fact that the suction fan comes into effect and carries these currents onward through and thence out of the machine.

In referring in this specification to the action of the air on the straw, it will be understood that in the term straw are included such chaff and other particles, not grain, as naturally accompany the straw in its travel under the influence of the mechanism and air currents of this machine. The operation will also be understood from the foregoing description without specifically repeating the operation, with the further observation that my invention involves this combined blast and suction action; combines with these two actions, or either of them, the settling chamber as an additional feature, though not in all cases an indispensable one; and combines with the blast and suction, or with either of them, the agitator; and that these several features and principles of my invention are quite independent for their realization in practice of specific mechanism, so long as some means are provided for effecting these operations. In other words, I wish it to be understood that I do not desire to be limited to the exact details of construction shown and described, for obvious modifications will occur to a person skilled in the art. It will also be noted that the shoe, with its screen or chaffer located near and in a plane below, and thereby combined with, the threshing devices, with the addition of the blast blower, enables me to gather and clean that part of the grain which is separated by the threshing devices.

Having thus fully described my invention, what I claim as new and desire to secure by Letters Patent is:—

1. A machine of the character described having a separating chamber, threshing devices therefor, a blower for producing an air blast in said chamber, and a suction fan for producing an air suction current, the blast and suction currents coöperating, the blast to deliver the straw substantially to the suction current, and the latter to carry it away.

2. A machine of the character described having a separating chamber, threshing devices therefor, a blower for producing an air blast in said chamber, and a suction fan for producing an air suction current, the said blast and suction currents uniting in operation within said chamber, the one to deliver and the other to receive and take off the grain straw.

3. A machine of the character described having a separating chamber, threshing devices therefor, a shoe thereunder, with a screen or chaffer between the shoe and the chamber, a blower for producing an air blast in said chamber, and a suction fan for producing an air suction current, the shoe to receive the threshed and separated grain, the air blast to float and lift the straw to the suction current and the latter to take away the straw.

4. A machine of the character described having a separating chamber, threshing devices therefor, a shoe thereunder, with a screen or chaffer between the shoe and the chamber, a blower to force an air blast through the screen or chaffer into the separating chamber, and a suction fan to produce an air suction current, the blast current floating and lifting the straw, to the suction current and the latter taking it up and carrying it away and the screen or chaffer admitting the threshed and separated grain into the shoe.

5. A machine of the character described having a separating chamber, threshing devices near one end thereof, a shoe under the chamber, with a screen or chaffer between the shoe and chamber, a blower directing an air blast through the shoe and screen or chaffer and into the chamber, means to deflect or direct the air blast located between the blower and separating chamber, and a suction fan located beyond the chamber and communicating therewith to produce a suction current from the chamber on the one side and to deliver the gathered straw from the other side.

6. A machine of the character described having a separating chamber and a settling chamber in communication therewith, threshing devices for the former, a blower for producing an air blast in the separating chamber, and a suction fan beyond the settling chamber for producing a suction current from the separating chamber and through the settling chamber.

7. A machine of the character described having a separating chamber and beyond that a settling chamber, threshing devices in advance of the former, a shoe communicating with the separating chamber, a blower to produce an air blast in the separating chamber and a suction fan beyond the settling chamber to produce a suction current from the separating chamber and through the settling chamber.

8. A machine of the character described having a separating chamber and beyond that a settling chamber, a baffle-wall between the chambers, the two chambers being in communication, threshing devices in advance of the separating chamber, a blower to produce an air blast therein on one side of the baffle-wall, and a suction fan beyond the settling chamber to produce a suction current from the separating chamber and through the settling chamber.

9. A machine of the character described having a separating chamber, and a settling chamber, a baffle wall between said chambers, a deflector in said settling chamber, a shoe having a screen or chaffer between it and the separating chamber, a blower to produce an air blast through the shoe and its screen or chaffer and in the separating chamber, and a suction fan beyond the settling chamber and its deflector to produce a suction current from the separating chamber past the deflector and through the settling chamber.

10. A machine of the character described having a separating chamber and a settling chamber beyond it, a baffle-wall between the chambers, a deflector in the settling chamber, threshing devices in advance of the separating chamber, a shoe under said chamber, with a screen or chaffer between the shoe and chamber, a blower to produce air currents through the shoe and thence into the separating chamber, a suction fan beyond the settling chamber to produce an air suction current from the separating chamber, past the deflector and through the settling chamber, a conveyer to receive tailings from the shoe and another conveyer to receive grain from the settling chamber, and elevating means to deliver the discharge from said conveyers back into the machine.

11. A machine of the character described having a settling chamber, a baffle-wall on the one side and a fan beyond the same so as to draw air currents through said chamber, and a deflector in the chamber past which said air currents travel toward the fan.

12. A machine of the character described having a settling chamber, a grain exit therefor, a baffle-wall on one side of said chamber, a suction fan drawing currents of air from the other side, a deflector between the wall and the fan, and a carrier or raddle for effecting a partial continuation from near the deflector to near the fan.

13. A machine of the character described having a separating chamber, threshing devices therefor, a blower to produce an air blast therein, a suction fan to produce an air suction therefrom, said blast and suction coöperating in acting on the straw, and an agitator in the chamber to coöperate with the blast in floating and lifting the straw.

14. A machine of the character described having a separating chamber, threshing devices therefor, an agitator in the chamber and extending from near the threshing devices toward the discharge end of the machine, a blower having communication with the chamber beneath said agitator and arranged to blow a blast through and past the agitator, and a suction fan to produce an air suction from above the agitator said blast and suction coöperating in acting on the straw.

15. A machine of the character described having a separating chamber and a settling chamber beyond it, threshing devices in advance of the separating chamber, an agitator between the threshing devices and the settling chamber, a blower to produce a blast which passes through the agitator and into the separating chamber, and a suction fan which produces an air suction from above the agitator, thence through the settling chamber, said blast and suction coöperating in acting on the straw.

16. A machine of the character described having a separating chamber, a settling chamber beyond it, threshing devices in advance of the first chamber, an agitator in said first chamber, a blower for producing a blast through the agitator and into the first chamber, a baffle-wall between the two chambers, a deflector in the second chamber, and a suction fan blower to produce an air suction from above the agitator, thence past the deflector and through this second chamber, said blast and suction coöperating in acting on the straw.

17. A machine of the character described having a separating chamber, and an agitator therein composed of a series of rods extending longitudinally and upward at one end, and means to operate said agitator and a blower to carry the straw along and away from said agitator, the upward portion of the rods directing in part the course of the straw.

18. A machine of the character described having a separating chamber, a blower for producing an air blast in said chamber, a conveyer casing adjacent to said chamber, a conveyer therein, and a door at one end of the conveyer casing to prevent the blast entering from the chamber from passing through the conveyer casing.

19. A machine of the character described having a settling chamber, a suction fan for producing an air suction current through said chamber, a conveyer casing, a conveyer therein, and a door for the conveyer casing to prevent the air current from passing through the said casing.

20. A machine of the character described having threshing devices, and a settling chamber beyond such devices, and a suction fan combined with said chamber and beyond the same, so as to draw air currents through said chamber.

21. A machine of the character described having threshing devices, a settling chamber beyond such devices, and a blower and suction fan combined with said chamber, one in advance of the chamber, to blow air blasts toward the same, and the other beyond the settling chamber to draw currents of air through the same.

In testimony whereof, I affix my signature in presence of two witnesses.

HENRY R. ROBINSON.

Witnesses:
S. E. SWAYNE,
H. E. ROBINSON.